Patented Sept. 26, 1944

2,358,979

UNITED STATES PATENT OFFICE 2,358,979

EXTRACTION OF LACTONES AND PHENOLS FROM PYROLIGNEOUS ACID

Robert M. Isham and Otto Spring, Okmulgee, Okla., assignors to Danciger Oil & Refineries, Inc., Tulsa, Okla., a corporation of Oklahoma No Drawing. Application March 26, 1940, Serial No. 326,112

4 Claims. (Cl. 260—344)

This invention relates to a method of producing valuable organic products from cheap source material, more particularly to the production of such compounds as higher phenols and lactones from pyroligneous acid.

As is known, there are two general methods of treating pyroligneous acid for the recovery of methanol and acetic acid. In the first and older method the pyroligneous acid, after preliminary treatment to separate the tar, was treated with lime to convert the acetic acid to acetate of lime and the liquor was distilled to recover methanol. Due to certain economic factors, important among which were the development of synthetic acetic acid and synthetic methanol, the wood distillation industry was severely pressed to reduce costs to compete with these synthetic products. Largely as a result of this urge, the second general method of working up pyroligneous acid was developed, namely the treatment of the liquor with a selective solvent to extract the acetic acid.

The present process relates to such solvent extraction processes and provides a novel method whereby valuable products which were heretofore wasted are recovered. This invention is, therefore, based upon the discovery that valuable compounds contained in pyroligneous acid are recoverabe by an eminently simple and effective method. As will be seen, such improved method is technologically advantageous not only in the fact that it enables the production of new and valuable products but also that it happily supplements the solvent extraction of the fatty acids, that is to say, that the present method may be correlated and utilized with existing solvent extraction processes to insure marked economies in the entire treatment.

It has been discovered that the spent aqueous liquor which remains after the extraction of the fatty acids by the various immiscible solvents used contains appreciable amounts of valuable products. It has been determened, for example that such aqueous liquor contains from five to ten grams per liter of neutral aliphatic lactones, principally butyrolacetone, and substantially the same amount of higher phenols, such as guaiacol and the like.

It has been ascertained that these compounds may be extracted by a wide variety of solvents and that such solvents may or may not be solvents for acetic acid. To indicate the wide potential range of available solvents, as well as their relative efficiencies, a series of preliminary tests were made. For this purpose a standard solution was utilized which comprised 50 cc. of a 1% solution of butyrolactone.

In carrying out the tests such a solution was shaken in a separatory funnel with four successive 10 cc. portions of the particular solvent being tested and the remaining aqueous solution analyzed for unextracted butyrolactone. In the following table is shown the percentage of the original quantity of butyrolactone which was extracted by the different solvents.

Table I

| Solvent used | Per cent of butyrolactone extracted from 1% aqueous solution |
|---|---|
| Mixture of secondary acetate esters, B. P. 166–175° C. | 37.9 |
| Cocoanut oil fatty acids | 21.3 |
| Secondary butyl acetate | 43.3 |
| Olive oil | 11.2 |
| Secondary hexyl alcohol | 23.5 |
| Secondary heptyl propionate | 30.0 |
| Secondary decyl alcohol | 12.8 |
| Mixture (equal volumes of secondary hexyl alcohol and secondary butyl acetate) | 53.3 |
| Normal butyl acetate | 53.5 |
| Ethyl oleate | 29.3 |
| Benzene | 49.7 |
| "Limpid oil" (a mixture of coal tar hydrocarbons distilling between 218° and 264° C.) | 59.3 |
| Mono-isopropyl naphthalene | 33.3 |
| Naphthene base transformer oil | 15.5 |
| Isopropyl phenyl isopropyl ether | 81.5 |
| Cresol | 92.0 |

In order to determine the ultimate concentration of butyrolactone which may be obtained by countercurrent contact with the solvents additional tests were made. Such tests consisted in shaking up a sample of the solvent with ten successive quantities of a .5% aqueous solution of butyrolactone. Thereafter the butyrolactone content of the solvent was determined. For such tests certain of the more effective solvents were chosen, namely benzene, "limpid oil" and isopropyl phenyl isopropyl ether and the high boiling wood tar oils used as a solvent in a commercial Suida vapor phase extraction unit. These particular solvents were chosen because they possess the desirable characteristics for a selective solvent, namely substantial insolubility in water, high solvent power for butyrolactone, thermal and chemical stability, and boiling points which are sufficiently removed from the desired constituents of pyroligneous acid to render the subsequent separation easy. The results of such tests are given in the following table:

Table II

| Solvent | Concentration of butyrolactone in equilibrium with 0.5% aqueous solution, grams/liter |
|---|---|
| Benzene | 9.65 |
| "Limpid oil" | 11.1 |
| Isopropyl phenyl isopropyl ether | 23.9 |
| High boiling wood tar oil | 4.28 |

It is to be observed that isopropyl phenyl isopropyl ether serves most effectively for the described extraction. The distribution coefficient between this solvent and the butyrolactone is most advantageous and permits of a high recovery with minimal amounts of the solvent, for example with less than half the amount of benzene or limpid oil.

With the effectiveness of such solvents thus preliminarily determined additional experiments were conducted utilizing the commercial source material, that is to say the spent aqueous liquor remaining after the extraction of fatty acids from pyroligneous acid in a commercial wood distillation plant. A quantity of such liquor was exhaustively extracted with benzene in a continuous extraction apparatus. The particular aqueous liquor which was treated initially contained 5.8 g. per liter of lactones (calculated as butyrolactone). The extraction was continued until 97% of the lactones had been removed from the aqueous liquor. Thereafter the benzene was distilled off from the extracted material. The concentrate remaining amounted to 11 grams per liter of the original aqueous liquor used for extraction and consisted of a mixture of lactones and phenols distilling largely between 190° C. and 220° C.

The concentrate was fractionated to separate the lactones and phenols by adding water and distilling. The phenols were distilled over with the steam and were collected in a continuous decanter from which the phenols were discharged to a receiver and the water returned to the distilling column. After all of the phenols were distilled off, the water and lactones were separated by fractional distillation.

By the proper choice of the solvent other recovery methods may be utilized. For example, isopropyl phenyl ether is a very satisfactory solvent for the lactones and higher phenols. This solvent has a boiling range of 260° C. to 270° C. and is almost completely insoluble in water. Since the solvent is less volatile than the extracted material (butyrolactone B. P. 206° C.) it is thus possible to recover the extracted constituents by distilling them off from the extract. Since the proportion of dissolved material in the extract is relatively small such a recovery system insures marked heat economies as compared to a system utilizing a low boiling solvent.

It will be observed that the present invention, although it may easily be effectuated with a wide variety of solvents is based on a concept which is new. In prior practices there was no thought of separately recovering these valuable products as separate fractions and with the methods employed such recovery could not be effected.

For example, in the prior processes of recovering the fatty acids from pyroligneous acid by extraction with high boiling solvents no attempts were made to recover the lactones. These remained in the solvent after removal of the fatty acids and were returned, together with the solvent, to the extraction system. Manifestly in these circumstances the solvent soon became saturated with lactones and the lactones in the pyroligneous acid thus passed out of the system with the spent aqueous solution.

Similarly in prior processes when low boiling solvents were employed lactones were not recovered. In such processes using, for example isopropyl ether (as in the Brewster process) any lactones or phenols extracted by the solvent remained in the residues left after distilling off the solvents and separating the fatty acids. Furthermore, since no attempts were made in such processes to treat spent aqueous solutions, large properties of these valuable products were lost in the discarded aqueous liquor.

It will readily be appreciated that the present improvement lends itself to incorporation in existing systems utilizing the principle of selective solvent extraction of fatty acids. For example, the present invention may be utilized in a plant using the Suida process. In such an installation the improved extraction step may be utilized to continuously treat the exhausted aqueous solution drawn off from the upper plates of the rectifying column.

It will also be appreciated that while the improved method has been described with particular relation to the treatment of pyroligneous acid it is available for the treatment of any aqueous system which contains the described compounds and which are desired to be extracted. For example, the principles of the invention may be invoked for the treatment of crude wood vinegar for the extraction of its contained valerolactone. In these circumstances solvents which have a good solvent power for the lactone and but a slight solvent power for acetic acid, such for example as benzene and limpid oil, are preferred.

Again it will be understood that while in most circumstances it is preferable to extract the desired products, such as lactones and higher phenols from a liquor aqueous phase, it is within the contemplation of the invention to effect such extraction in the vapor phase where the exigencies of a particular operation render such type of vapor extraction desirable.

While preferred methods of procedure have been described and while a number of different specific solvents have been mentioned, it is to be understood that these are given didactically to illustrate the fundamental principles of the invention and not as the exclusive means by which these principles may be effectuated. The invention broadly comprehends the concept of recovering valuable materials, which were heretofore wasted by extracting these with a suitable selective solvent from the aqueous source material.

We claim:

1. In the treatment of pyroligneous acid, that improvement which comprises extracting the spent aqueous liquor, remaining after removal of methanol and fatty acids, with an agent of the group consisting of benzene, limpid oil and isopropyl phenyl iso propyl ether to recover a water-free extract of lactones and phenols from the liquor.

2. In the treatment of pyroligneous acid, that improvement which comprises extracting the spent aqueous liquor, remaining after removal of methanol and fatty acids, with benzene to recover a water-free extract of lactones and phenols from the liquor.

3. In the treatment of pyroligneous acid, that improvement which comprises extracting the spent aqueous liquor, remaining after removal of methanol and fatty acids, with isopropyl phenyl iso-propyl ether to recover a water-free extract of lactones and phenols from the liquor.

4. In the treatment of pyroligneous acid, that improvement which comprises extracting the spent aqueous liquor, remaining after removal of methanol and fatty acids, with limpid oil to recover a water-free extract of lactones and phenols from the liquor.

ROBERT M. ISHAM.
OTTO SPRING.